US006853640B1

(12) United States Patent
Hayashi et al.

(10) Patent No.: US 6,853,640 B1
(45) Date of Patent: Feb. 8, 2005

(54) DATA SELECTION APPARATUS (75) Inventors: Tsunemasa Hayashi, Atsugi (JP);
Toshiaki Miyazaki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 767 days.

(21) Appl. No.: 09/715,295

(22) Filed: Nov. 17, 2000

(30) Foreign Application Priority Data

Nov. 19, 1999 (JP) .......................................... 11-329771

(51) Int. Cl.[7] .............................................. H04L 12/28
(52) U.S. Cl. ..................... 370/392; 370/395.1; 711/216; 711/221
(58) Field of Search .......................... 370/395.1–395.2, 370/389, 392; 711/216, 221

(56) References Cited

U.S. PATENT DOCUMENTS

| 5,386,413 | A | | 1/1995 | McAuley et al. |
| 5,475,825 | A | * | 12/1995 | Yonezawa et al. .............. 711/1 |
| 5,956,336 | A | * | 9/1999 | Loschke et al. ............ 370/392 |
| 6,237,061 | B1 | * | 5/2001 | Srinivasan et al. ......... 711/108 |
| 6,460,112 | B1 | * | 10/2002 | Srinivasan et al. ......... 711/108 |
| 6,539,455 | B1 | * | 3/2003 | Khanna et al. ............. 711/108 |

OTHER PUBLICATIONS

T. Hayashi et al., "Table Search Engine with Hit–flag Look Ahead Mechanism for Telecommunications", Technical Report of IEICE, IN99–92, TM99–58, OFS99–45, pp. 25–30, Jan., 2000.*

T. Hayashi, et al., "Table Search Engine for Telecommunications", Technical Report of IEICE, CPSY98–159, pp. 65–72, Jan., 1999.*

T. Hayashi et al., "High–Speed Table Lookup Engine for IPv6 Longest Prefix Match", GLOBECOM 99, 6 pp., Dec. 8, 1999.

B. Lampson et al., "IP Lookups Using Multiway and Multicolumn Search", Infocom, vol. 3, pp. 1248–1256, 1998.

P. Gupta et al., "Routing Lookups in Hardware at Memory Access Speeds", Infocom, vol. 3, pp. 1240–1247, 1998.

* cited by examiner

*Primary Examiner*—Steven Nguyen
*Assistant Examiner*—Roberta A Stevens
(74) *Attorney, Agent, or Firm*—Kenyon & Kenyon (57) ABSTRACT

A data selection apparatus which performs selection processes in parallel is provided. The data selection apparatus includes search units and a unit output control device. Each of the search units includes table search circuits and a data output control circuit which selects the highest priority output data. The unit output control device selects the highest priority output data from outputs of the search units. A table search circuit which succeeds in a search sends a search success signal to the data output control circuit. The search unit including the data output control circuit sends a unit search success signal to the unit output control device before performing a selection process for the highest priority data.

15 Claims, 13 Drawing Sheets

DATA SELECTION APPARATUS

BACKGROUND OF THE INVENTION

1. Field of the Invention

The present invention relates to an output data selection technique in which an output is selected from a plurality of outputs of table search circuits in a communication apparatus such as a network router and the like, wherein each of the table search circuits selects data from a data table, which data includes an entry matching a search key, the search key being a bit sequence of a part of input data and the data table including a plurality of data which is stored in a data storage in the table search circuit. The output data selection technique is used in a table search process in a router or a switch for example.

2. Description of the Related Art

Figure 1:
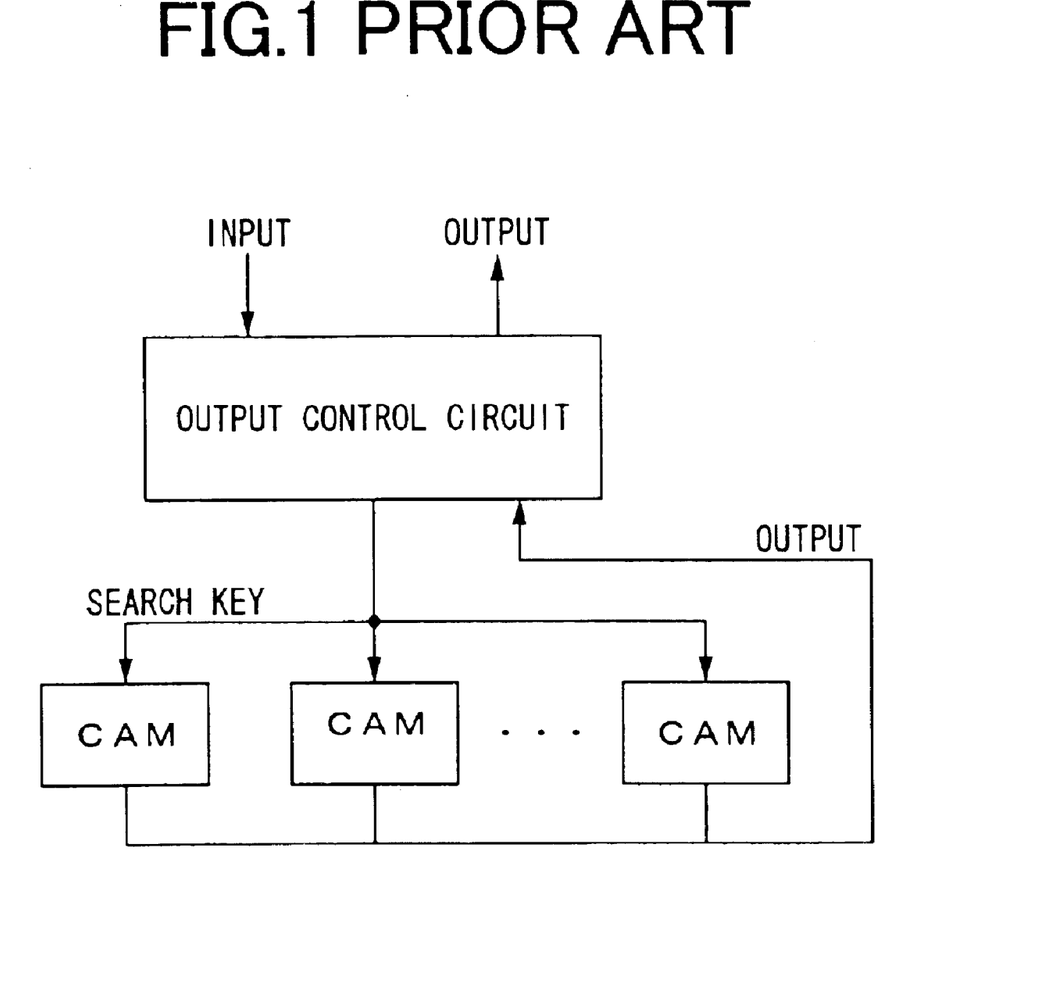
FIG. 1 shows a configuration example of a data selection apparatus using CAMs (Content Addressable Memories) according to a conventional technique.

FIG. 1 shows a configuration example of a data selection apparatus using CAMs (Content Addressable Memories) according to a conventional technique. The data selection apparatus shown in FIG. 1 includes a plurality of CAMs and an output control circuit which controls output of the CAMS. Each CAM performs a search process in parallel on a search key which is a part of input data. Each CAM which succeeds in the search sends a CAM search success signal to the output control circuit. The output control circuit selects a CAM of the highest priority from CAMs which succeed in the search so that a selected CAM outputs data.

Figure 2:
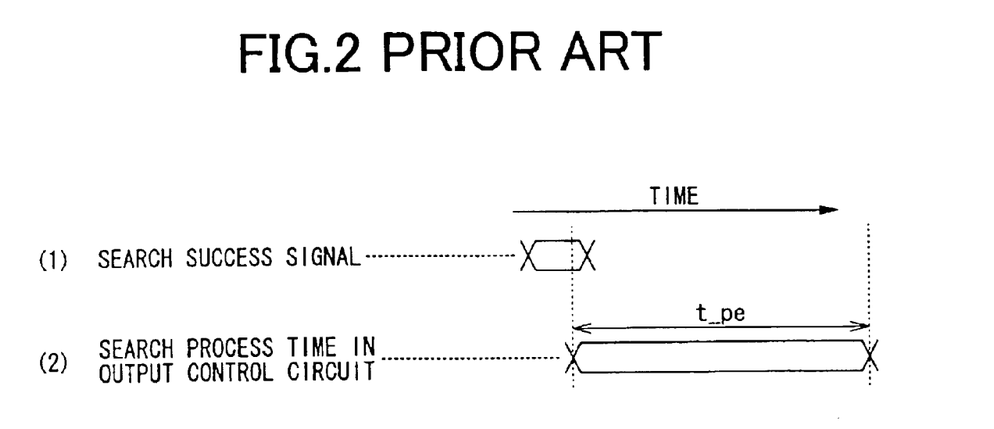
FIG. 2 shows a timing chart representing the operation of a data output selection process according to a conventional technique.

FIG. 2 shows a timing chart representing the operation of the data output selection process according to a conventional technology. (1) shows the CAM search success signal and (2) shows the time required for the data output selection process.

According to the above-mentioned configuration, if the number of CAMs is large, the time t_pe becomes very long due to the fact that the number of logic stages in the output control circuit becomes large.

That is, there is a problem in that when the number of CAMs which should be controlled by the output control circuit becomes large, process delay in the output control circuit becomes large. Consequently, process speed of the data selection apparatus is lowered.

SUMMARY OF THE INVENTION

It is an object of the present invention to provide a data selection apparatus which performs data selection by using table search circuits without lowering process speed.

The above object of the present invention is achieved by a data selection apparatus including:

search units each of which search units includes table search circuits and a first circuit which performs a first selection process in which a table search circuit which outputs data is selected from table search circuits each of which succeeds in a search based on input data; and a second circuit which performs a second selection process in which a search unit which outputs data is selected from search units each of which includes a table search circuit which succeeds in a search; wherein when the first circuit receives a first signal which indicates that there is a table search circuit which succeeds in a search, the first circuit sends a second signal to the second circuit without waiting a result of the first selection process, the second signal indicating that there is at least one table search circuit which succeeds in a search;

the second circuit performs the second selection process when the second circuit receives the second signal; and a search unit which is selected by the second selection process outputs data.

According to the above-mentioned invention, since the second signal is sent to the second circuit upon the first circuit receiving the first signal, the selection process by the first circuit and the selection process by the second circuit can be performed in parallel. Therefore, parallel processing where selection processes are divided becomes possible so that process time becomes shorter than in the case in which a selection process is performed in one stage.

The above object of the present invention is also achieved by a data selection apparatus including:

search units each of which search units comprises table search circuits and a data output control circuit, the table search circuit selecting data from a stored data table, which data includes an entry matching a search key which is a bit sequence of a part of input data, the data output control circuit performing a first selection process in which the highest priority output data is selected from outputs of the table search circuits; and a unit output control device which performs a second selection process in which the highest priority search unit is selected.

The table search circuit which succeeds in the search sends a data search success signal to the data output control circuit, and the data output control circuit sends a unit search success signal to the unit output control device before performing the first selection process.

The unit output control device selects the highest output priority search unit and sends a unit output enable signal to the search unit without waiting until the first selection process ends.

The search unit which receives the unit output enable signal sends an output enable signal to the highest priority decision table search circuit. The table search circuit which receives the output enable signal outputs data.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

[First Embodiment]

Figure 3:
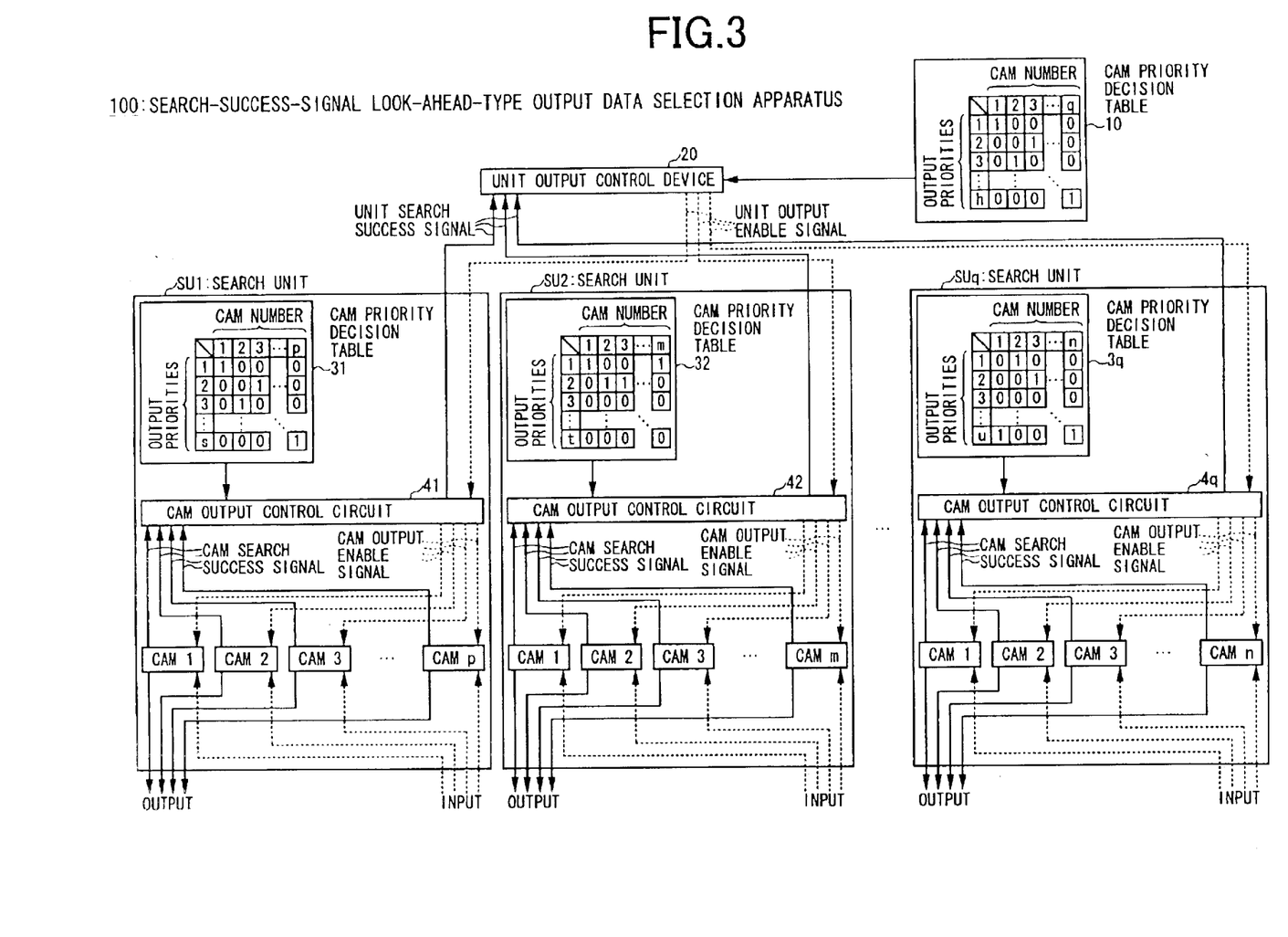
FIG. 3 shows a configuration of a search-success-signal look-ahead-type output data selection apparatus 100 according to a first embodiment of the present invention.

FIG. 3 shows a configuration of a search-success-signal look-ahead-type output data selection apparatus 100 (hereafter called data selection apparatus 100) according to a first embodiment of the present invention.

The data selection apparatus 100 includes a unit priority decision table 10, a unit output control device 20 and search units SU1, SU2, . . . , SUq. The unit priority decision table 10 is stored in a register of a PLD (Programmable Logic Device). Each of the search units SU1, SU2, . . . , SUq performs a search process on a search key which is input data. The unit output control device 20 decides priorities of output data which is output by each search unit SU1, SU2, . . . , SUq. For this purpose, the unit output control device 20 reads unit search success signals sent from the search units SU1, SU2, . . . , SUq and the unit priority-decision table 10. Then, the unit output control device 20 sends a unit output enable signal to a search unit which has the highest priority output data, the unit output enable signal permitting the search unit to output data.

The search unit SU1 includes a plurality of content addressable memories CAM1–CAMp, a CAM priority decision table 31 and a CAM output control circuit 41. The CAM priority decision table 31 is stored in a register of a PLD for deciding priorities of output data of the content addressable memories CAM1–CAMp.

The CAM output control circuit 41 reads the CAM priority decision table 31, and sends a CAM output enable signal to a CAM which has output data of the highest priority from among output data of the CAM1–CAMp, the CAM output enable signal permitting the CAM to output the output data.

The search unit SU2 includes a plurality of content addressable memories CAM1–CAMm, a CAM priority decision table 32 and a CAM output control circuit 42. The CAM priority decision table 32 is stored in a register of a PLD for deciding priorities of output data of the content addressable memories CAM1–CAMm.

The search unit SUq includes a plurality of content addressable memories CAM1–CAMn, a CAM priority decision table $3q$ and a CAM output control circuit $4q$. The CAM priority decision table $3q$ is stored in a register of a PLD for deciding priorities of output data of the content addressable memories CAM1–CAMn.

The CAM which receives the CAM output enable signal from the CAM output control circuit in the search unit which receives the unit output enable signal outputs final output data in the data selection apparatus 100.

The above-mentioned content addressable memory (CAM) is an example of a table search circuit. The table search circuit selects data from a data table stored in a memory and including a plurality of data, which selected data includes an entry matching a search key, the search key being a part of input data. The table search circuit can be realized by, for example, an MPU and a RAM, or an SRAM and hardware logic, or the like. The above-mentioned data table is kept by the table search circuit.

The CAM output control circuits 41, 42, . . . , $4q$ are examples of a data output control circuit which selects data of the highest priority among data output by the table search circuits.

Each of the search unit SU1, SU2, . . . , SUq is an example of a search unit which includes a plurality of table search circuits and the data output control circuit.

Figure 4:
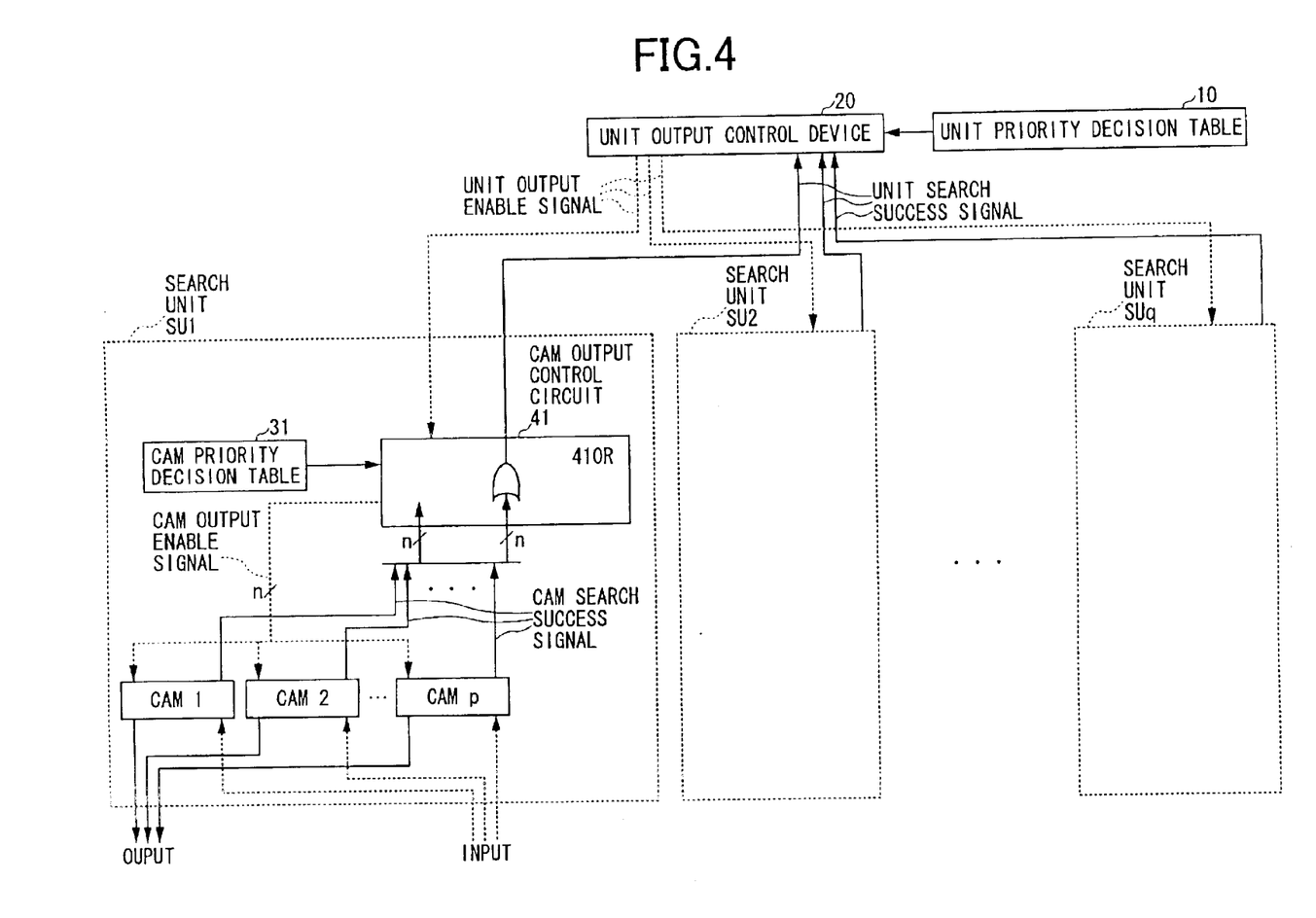
FIG. 4 is a figure for explaining a configuration for performing an output data selection process in the data selection apparatus 100.

FIG. 4 is a figure for explaining a configuration for output data selection in the data selection apparatus 100.

In the search unit SU1, the CAM search success signals are sent to the CAM output control circuit 41 from the content addressable memories CAMs which succeed in a search using a search key. As shown in the figure, the CAM output control circuit 41 includes an OR circuit 410R. The OR circuit 410R performs a logical OR operation on the CAM search success signals sent from the content addressable memories CAM1–CAMp. Then, the CAM output control circuit 41 sends the unit search success signal to the unit output control device 20 before selecting a CAM which has the highest priority data.

A part which receives the CAM search success signals and sends the unit search success signal to the unit output control device 20 is not necessarily in the CAM output control circuit. Thus, the OR circuit can be located outside of the CAM output control circuit such that the OR circuit sends the unit search success signal to the unit output control device 20.

Upon receiving the unit search success signals, the unit output control device 20 performs a selection process for selecting a search unit having the highest priority output data among search units. Therefore, the selection process is started quickly. That is, a selection process for selecting a CAM from CAMs by the CAM output control circuit 41 is performed concurrently with a selection process for selecting a search unit by the unit output control device 20.

The unit output control device 20 selects a search unit which outputs the highest priority output data and sends a unit output enable signal to the search unit. By then, each CAM output control circuit selects a CAM.

A CAM output control circuit (one of CAM output control circuits 41–$4q$) which receives the unit output enable signal sends a CAM output enable signal to a CAM which is selected by the CAM output control circuit.

Figure 5:
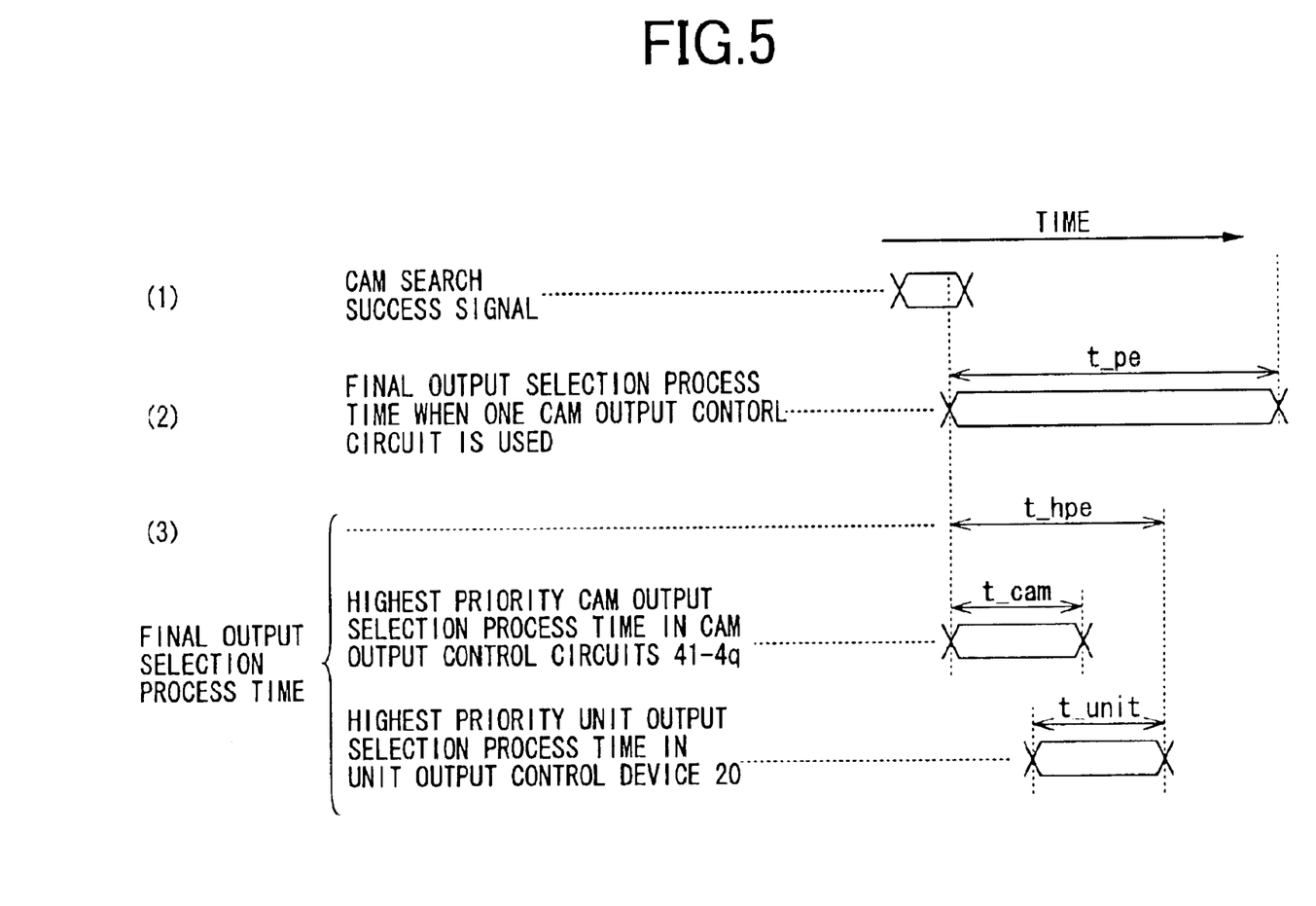
FIG. 5 is a timing chart for explaining the operation of the output data selection process in the data selection apparatus 100.

In (3) of FIG. 5, a timing chart which shows the operation of the output data selection in the data selection apparatus 100 is shown. For a comparison, (2) shows a timing chart according to a conventional configuration.

As mentioned before, in the conventional case that a CAM output control circuit performs the output data selection process for all CAMs, if the number of CAMs becomes large, the time for the process t_pe becomes very long.

On the other hand, since the data selection apparatus 100 of the present invention adopts a hierarchical output selection structure as shown in FIG. 3, the time t_hpe taken for selecting the final output data is comprised of the selection process time by the CAM output control circuits 41–$4q$ t_cam and the selection process time by the unit output control device 20 t_unit. Since the CAM output control circuits 41–$4q$ and the unit output control device 20 perform output data selection processes simultaneously, t_hpe becomes shorter than t_pe. That is, the final output data selection can be performed faster according to the present invention.

Each CAM1–CAMp has a CAM search success signal output circuit which sends the CAM search success signal to the CAM output control circuit when the CAM succeeds in the search (the CAM can be called a hit circuit).

The OR circuit 410R is an example of a unit search success signal output circuit which sends the unit search success signal to the unit output control device, the unit search success signal indicating that at least one hit circuit exists in the search unit.

The description of FIG. 5(3) can be also applied to each of the search units SU2, . . . , SUq.

The unit output control device 20 has a part which performs the unit selection process on the basis of the unit search success signal at the same time when the CAM output control circuit performs the output data selection process on the basis of the CAM search success signal.

Figure 6:
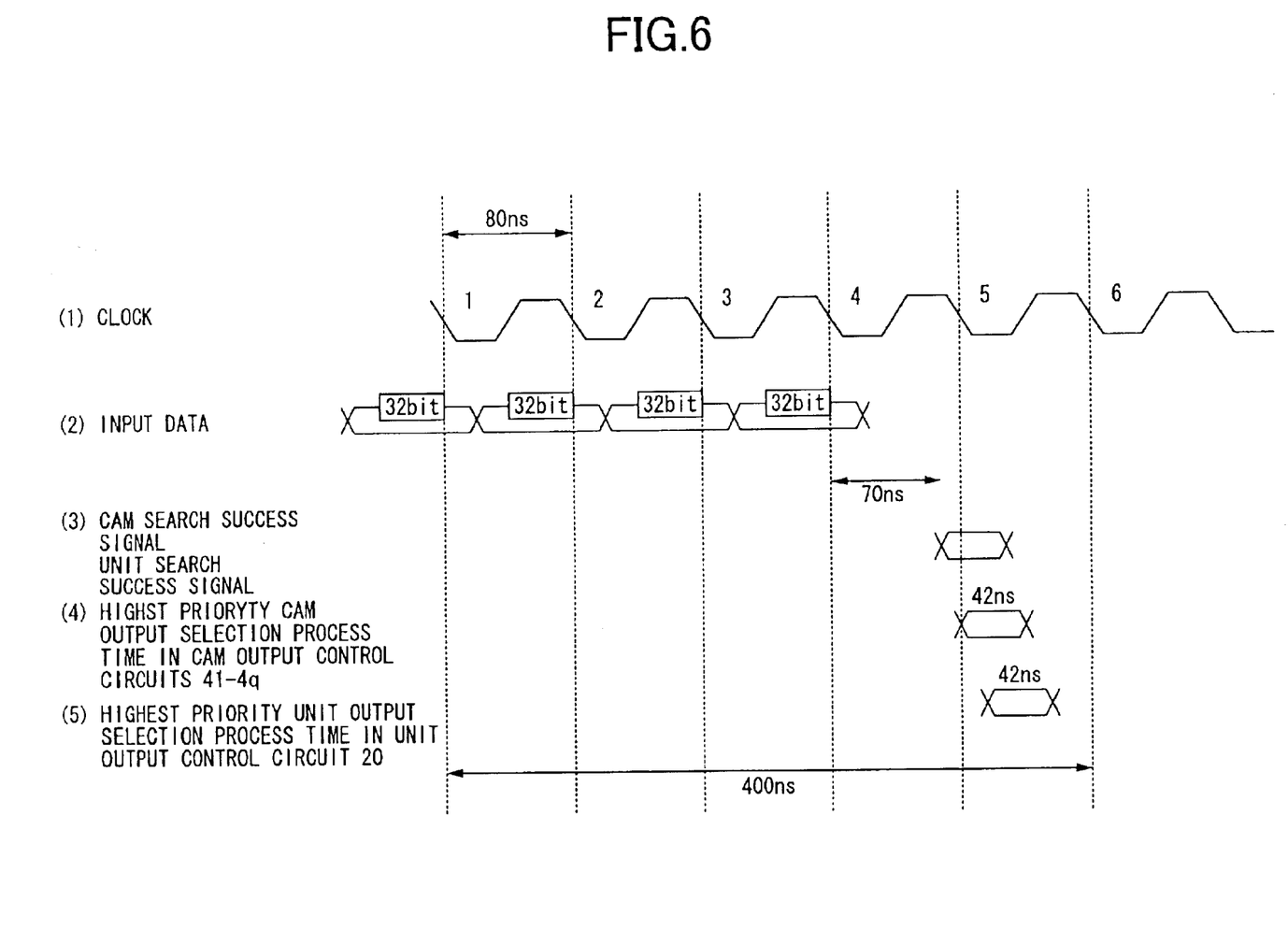
FIG. 6 is a timing chart showing the output data selection process according to the first embodiment.

FIG. 6 is a timing chart showing the output data selection process according to the first embodiment.

In the example shown in FIG. 6, the content addressable memory CAM operates on a 12.5-MHz cycle having a period of 80 ns. When input data is 128 bits, data input requires four clock cycles since an input port of the content addressable memory CAM handles 32 bits. Since the CAM search success signal or the unit search success signal can be sent after three clocks+70 ns later according to the specification of the content addressable memory CAM, the operation of CAM selection or unit selection starts at the start of the fifth clock cycle.

Since the process performed In each of the CAM output control circuits 41, 42, . . . , 4q and the unit output control device 20 takes 42 nsec, and encoding takes less than one clock cycle, output data can be processed at the next clock cycle (sixth clock cycle).

According to the example shown in FIG. 6, the data output selection process can be performed within 400 nsec, which is equivalent to an operation speed of 2.5 Mpps (Mega packets per second). Thus, the above-mentioned data selection apparatus can be used for network operation of 622 Mbps (OC-12, 1.5 Mpps).

[Second Embodiment]

Figure 7:
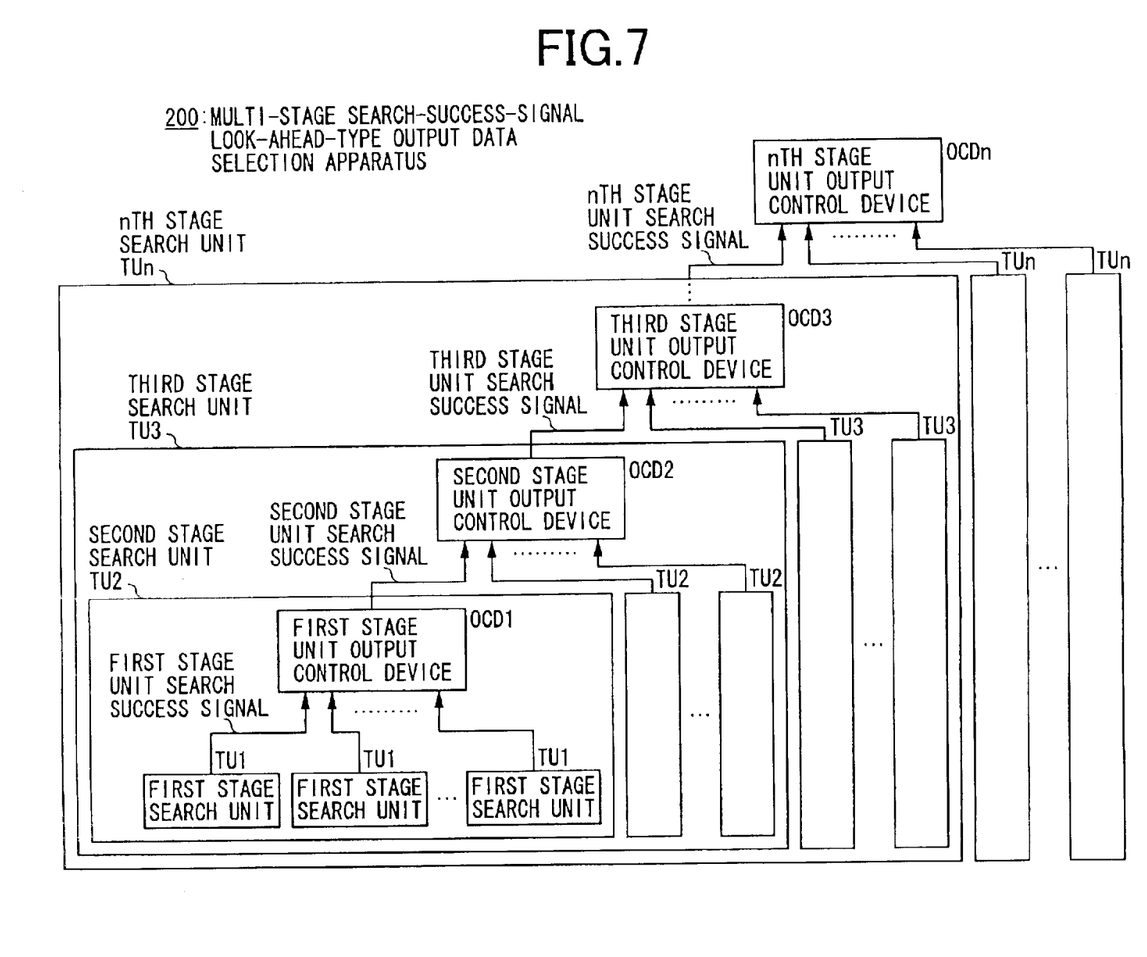
FIG. 7 is a schematic block diagram of a multi stage search-success-signal look-ahead-type output data selection apparatus 200 according to a second embodiment.

FIG. 7 is a schematic block diagram of a multi-stage search-success-signal look-ahead-type output data selection apparatus 200 (hereafter called data selection apparatus 200).

In the data selection apparatus 200, a plurality of first stage search units TU1s and a first stage unit output control device OCD1 form a second stage search unit TU2.

A plurality of second stage search units TU2s and a second stage unit output control device OCD2 form a third stage search unit TU3.

Further, a plurality of third stage search units TU3s and a third stage unit output control device OCD3 form a fourth stage search unit TU4, so that, nth stage search units TUns are formed.

Each nth stage search unit TUn sends a nth stage unit search success signal to an nth stage unit output control device OCDn.

Each unit output control device of each stage includes a unit priority decision table and reads this when the unit output control device selects the highest priority output data in the same way as performed in the data selection apparatus 100.

The configuration of the first stage search unit is the same as each of the search units SU1–SUq shown in FIG. 3. When at least one content addressable memory CAM in the first stage search unit succeeds in a table search on a search key, each of hit CAMs sends a CAM search success signal to a CAM output control circuit in the first stage search unit TU1.

In the same way as the data selection apparatus 100, the CAM output control circuit in the data selection apparatus 200 performs a logical OR operation on CAM search success signals which are sent from the CAMs. Then, a first stage unit search success signal sent from the CAM output control circuit is read by the first stage unit output control device OCD1 before the CAM output control circuit selects a CAM having the highest priority output data. Accordingly, the highest priority CAM selection process by the CAM output control circuit and the highest priority unit selection process by the first stage unit output control device OCD1 are performed simultaneously.

Similarly, an (n−1)th (n≧2) stage unit output control device performs a logical OR operation on (n−1)th stage unit search success signals which are sent from (n−2)th stage output control devices. Then, a nth stage unit search success signal sent from the (n−1)th stage output control device is read by the nth stage unit output control device OCDn before the (n−1)th stage unit output control device selects a (n−2)th stage unit of the highest priority. Accordingly, the highest priority unit selection process by the (n−1)th stage unit output control device and the highest priority unit selection process by the nth stage unit output control device are performed simultaneously. Then, the nth stage unit output control device OCDn sends an nth stage unit output enable signal to a selected (n−1)th stage unit output control device.

Finally, a first stage unit output control device OCD1 sends a first stage unit output enable signal to a CAM output control circuit if the first stage search unit is selected for outputting the highest priority output data. The CAM output control circuit which receives the enable signal sends a CAM output enable signal to a CAM having the highest priority output data so that the CAM outputs the output data.

Figure 8:
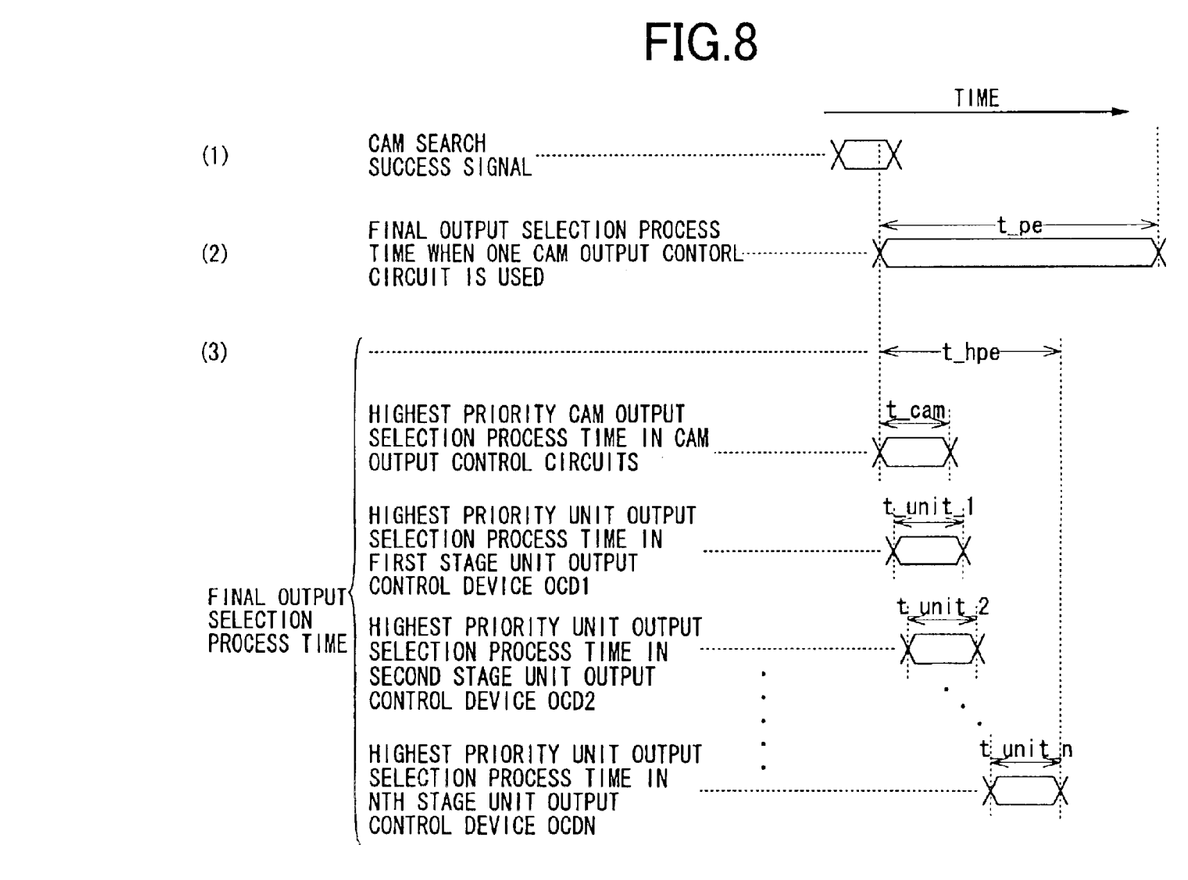
FIG. 8 is a timing chart showing the operation of the output data selection process in the data selection apparatus 200.

FIG. 8 is a timing chart showing the operation of output data selection in the data selection apparatus 200.

As shown in (2), if a CAM output control circuit performs a conventional selection process for all CAMs, the time taken for the selection process t_pe becomes very long when the number of CAMs is large.

On the other hand, since the data selection apparatus 200 of the present invention adopts a hierarchical output selection structure as shown in FIG. 7, the time t_hpe for selecting the final output data is comprised of the selection process time by the CAM output control circuits t_cam and the selection process time by the unit output control devices t_unit_1 to t_unit_1_n. Since the CAM output control circuits 41–4q and the unit output control devices perform output data selection processes simultaneously as shown in FIG. 8 (3), t_hpe becomes shorter than t_pe. That is, the final output data selection can be performed faster according to the present invention.

In the configuration shown in FIG. 7, the first stage unit search success signal can be sent to unit output control devices of second or later stages as well as sent to the first stage unit output control device. Accordingly, delay in the unit output control devices of each stage can be decreased so that t_hpe shown in FIG. 8 can be further shortened.

[Third Embodiment]

Figure 9:
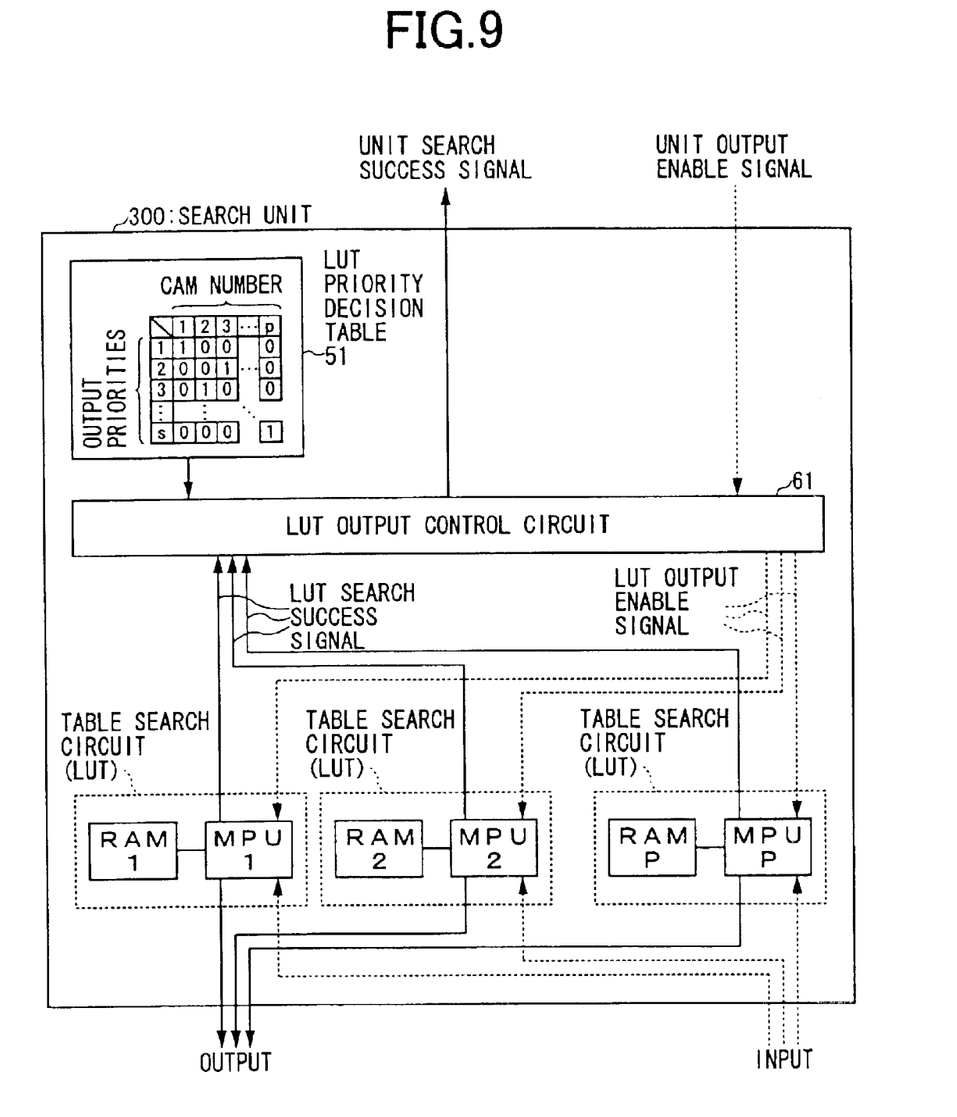
FIG. 9 is a block diagram of a search unit 300 according to a third embodiment of the present invention.

FIG. 9 is a block diagram of a search unit 300 according to a third embodiment of the present invention.

The search unit 300 can be used in the data selection apparatus 100 or in the data selection apparatus 200 as a substitute for each of the search units SU1–SUq or the first stage search unit TU1.

The search unit 300 includes table search circuits LUTs (LUT means Look-Up Table circuit), an LUT priority decision table 51 and an LUT output control circuit 61. The table search circuit LUT performs a table search process on the basis of a search key. The LUT priority decision table 51 is used for deciding priorities of output data which is output by each LUT. The LUT output control circuit 61 reads the LUT priority decision table 51 and selects a table search circuit LUT which has the highest priority output data so that the LUT output control circuit 61 permits the table search circuit LUT to output the output data.

The table search circuit LUT includes a RAM (Random Access Memory) and an MPU (Micro-Processing Unit). The MPU compares each of a plurality of data which is stored in an inside storage area of the RAM with a search key.

By substituting the search unit 300 for each of the search units SU1–SUq in the data selection apparatus 100 or for the first stage search unit TU1 in the data selection apparatus 200, a search-success-signal look-ahead-type output data selection apparatus can be realized in which the highest output data in a table search circuit can be selected as speedily as the data selection apparatus 100 or 200.

The LUT output control circuit 61 is an example of a data output control circuit which selects the highest priority output data among data output from each table search circuit.

Each CAM in the data selection apparatus 100 is an example of a data search success signal output means which output a data search success signal to a data output control circuit when the CAM succeeds in a table search using a search key. The data search success signal output means can be realized by hardware like this. On the other hand, the means can be also realized by software like the table search circuit LUT in the search unit 300.

In addition, a unit search success signal output means which sends a unit search success signal to a unit output control device can be realized by either hardware or software, a unit search success signal indicating that at least one hit circuit exists in the search unit.

[Fourth Embodiment]

Figure 10:
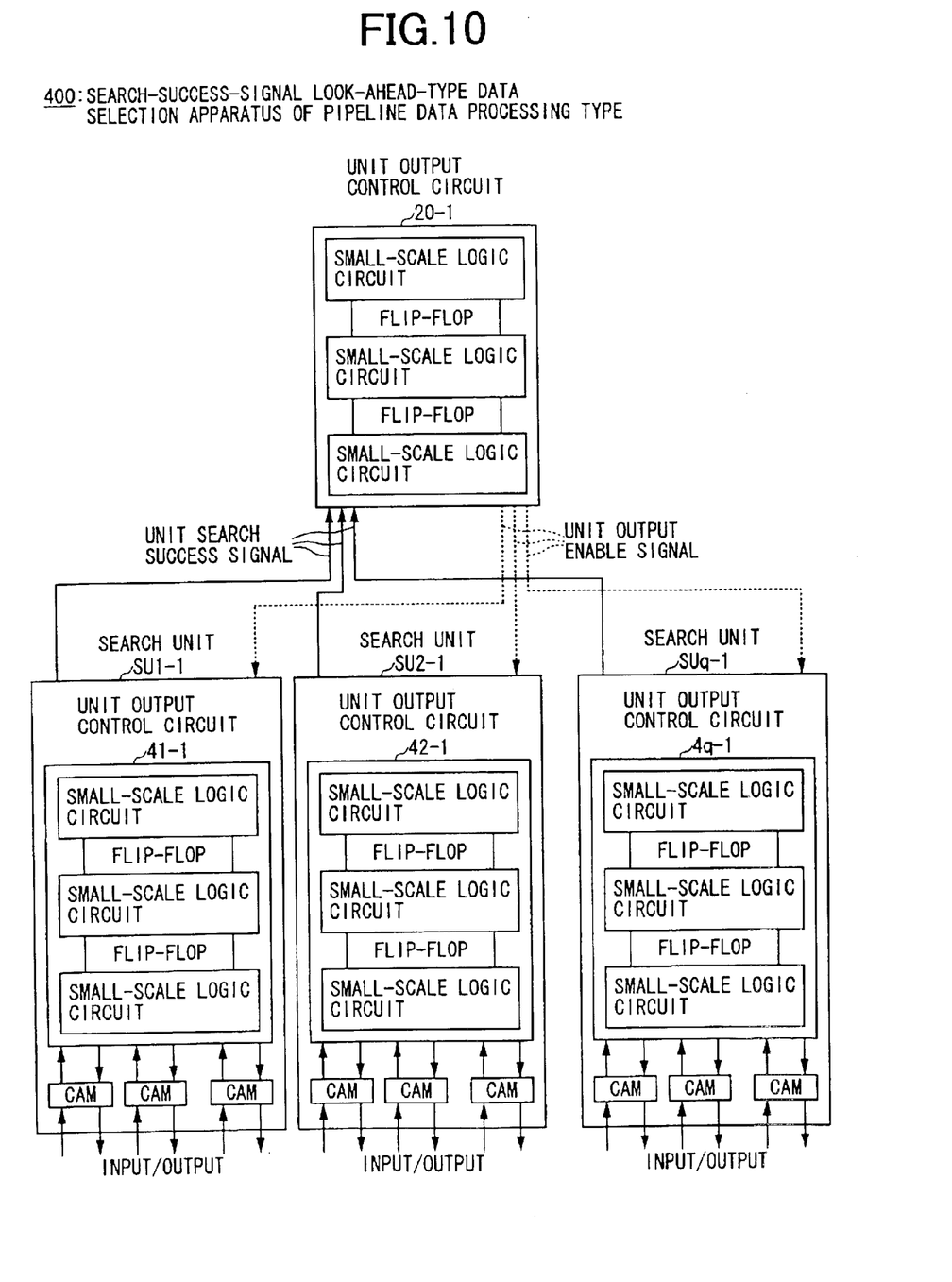
FIG. 10 is a block diagram of a search-success-signal look-ahead-type data selection apparatus of a pipeline data processing type 400 according to a fourth embodiment.

FIG. 10 is a block diagram of a search-success-signal look-ahead-type data selection apparatus of pipeline data processing type 400 (hereinafter called a data selection apparatus 400).

The data selection apparatus 400 uses unit output control circuits 41-1, 42-1, ..., 4q-1 instead of the CAM output control circuits in the data selection apparatus 100 and a unit output control circuit 20-1 instead of the unit output control device 20.

The unit output control circuit 41-1 is divided into small-scale logic circuits by a plurality of flip-flops in which time series pipeline processing is performed by the small-scale logic circuits. Each of the unit output control circuits 42-2, ..., 4q-1 has the same configuration as the unit output control circuit 41-1.

The unit output control device 20-1 is divided into small-scale logic circuits by a plurality of flip-flops in which time series pipeline processing is performed by the small-scale logic circuits.

Since each of the CAM output control circuit and the unit output control circuit in the data selection apparatus 400 is configured by the small-scale logic circuits which have low delay, the data selection apparatus 400 can select final output data speedily when key data is input continuously.

[Fifth Embodiment]

Figure 11:
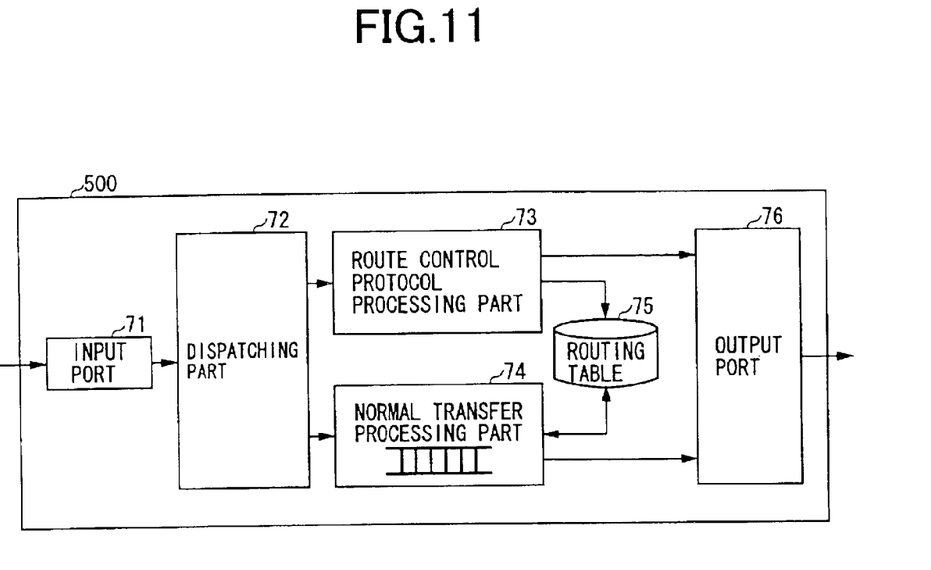
FIG. 11 is a block diagram of a router 500 which uses the data selection apparatus of the present invention.

The data selection apparatus of the present invention can be used in a packet processing apparatus such as a network router, an ATM switch or the like. FIG. 11 is a block diagram of a router 500 which uses the data selection apparatus of the present invention. The router 500 includes an input port 71 for inputting packets, a dispatching part 72 for dividing input packets into normal packets and other packets such as route control packets, a route control protocol processing part 73 for processing route control packets, a normal transfer processing part 74 for transferring normal packets, a routing table 75 and an output port 76 for outputting packets.

When an input packet is a packet used for route control, the packet is sent to the route control protocol processing part 73 via the dispatching part 72 and is used for updating the routing table 75 or is sent to another node through the output port 76. When the input packet is a normal packet, the packet is sent to the normal transfer processing part 74. In the normal transfer processing part 74, a destination to which the packet is transferred is decided on by searching the routing table 75 on the basis of a destination address of the packet. Then, the packet is transferred via the output port 76 corresponding to the destination. The data selection apparatus of the present invention is used as a part of the normal transfer processing part 74 and the routing table 75.

Figure 12:
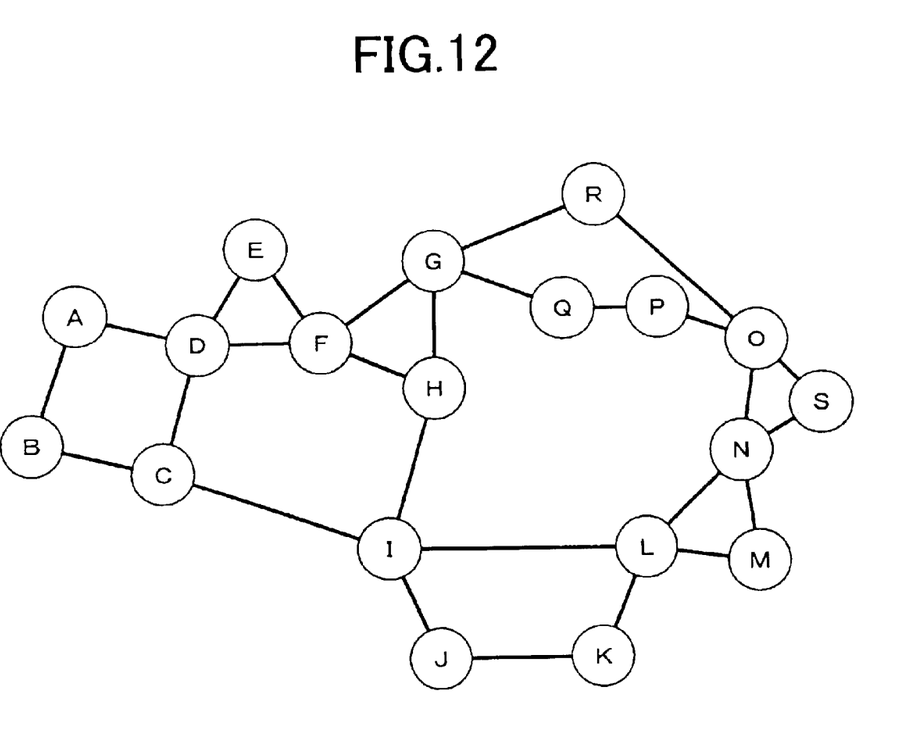
FIG. 12 shows an example of a TCP/IP network.
Figure 13:
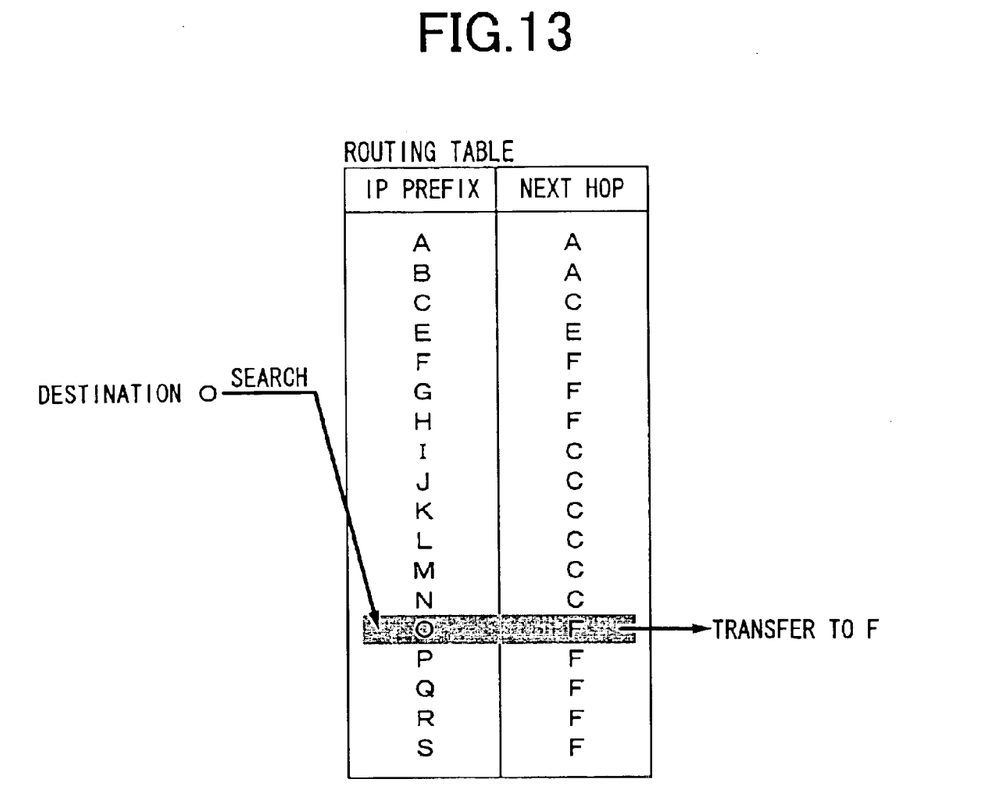
FIG. 13 shows an example of a routing table which is held by a node D shown in FIG. 12.

The operation of the router 500 will be further described in the following. FIG. 12 shows an example of a TCP/IP network. Each circle in FIG. 12 indicates a router (also called a node). Each router has a routing table. FIG. 13 shows an example of the routing table which is held by a node D. in FIG. 13, "IP prefix" means a part of an IP address of a destination network and "next hop" means an address of an adjacent node toward the destination or corresponding to the destination. As shown in FIG. 13, when the destination address of the input packet indicates "O", the router searches the routing table so that "F" is selected as a next hop.

More specifically, a longest prefix match method, for example, can be used when the routing table is searched in the Internet (IPv4). When the search unit is configured by CAMs like the first embodiment, the longest prefix match can be performed in the following way for example.

Entries are registered in CAMs, where each of entries in a CAM has the same mask of an IP address. CAMs where each of entries has its own mask can be also used. The mask is registered in a mask register. First, a search key is given to each CAM simultaneously, and mask processing and table search processing are performed in each CAM. Next, in output data in which the longest bit pattern is matched is selected on the basis of the priority decision table. The selection process is performed speedily by a multi-stage structure according to the present invention.

In addition, a modified binary tree/B tree method (Butler Lampson, et.al., IP Lookups using Multiway and Multicolumn Search, Infocom, vol.3, p.p. 1248–1256, 1998) or a two-way lookup table method (Pankaji Gupta, et.al., Routing Lookups in Hardware at Memory Access Speeds, Infocom, vol.3, p.p. 1240–1247, 1998) can be used for a table search in the data selection apparatus of the present invention. Each algorithm can be implemented by software or HW & SW in the configuration of the third embodiment of the present invention.

As mentioned above, according to the data selection apparatus which includes output control circuits and unit output control devices hierarchically, since the unit output control device reads search success signals from a plurality of output control circuits before the output control circuits start a selection process, the highest priority output data can be selected speedily even when a large number of table search circuits are used.

The present invention is not limited to the specifically disclosed embodiments, and variations and modifications may be made without departing from the scope of the invention.

What is claimed is:

1. A data selection apparatus comprising:

search units each of which search units includes table search circuits and a first circuit which performs a first selection process in which a table search circuit which outputs data is selected from table search circuits each of which succeeds in a search based on input data; and a second circuit which performs a second selection process in which a search unit which outputs data is selected from search units each of which includes a table search circuit which succeeds in a search;

wherein:

when said first circuit receives a first signal which indicates that there is a table search circuit which succeeds in a search, said first circuit sends a second signal to said second circuit before performing said first selection process, said second signal indicating that there is at least one table search circuit which succeeds in a search;

said second circuit performs said second selection process when said second circuit receives said second signal;

a search unit which is selected by said second selection process outputs data of a table search circuit that is selected by said first selection process; and said first selection process and said second selection process are performed in parallel at least in part so that output data of a table search circuit is selected.

2. The data selection apparatus as claimed in claim 1, wherein each of said search units has a third circuit, outside of said first circuit, which third circuit sends said first signal to said second circuit; and said first circuit performs said first selection process at the same time as when said third circuit sends said first signal to said second circuit.

3. The data selection apparatus as claimed in claim 1, wherein each of said table search circuits is a CAM.

4. The data selection apparatus as claimed in claim 1, wherein each of said table search circuits includes a RAM and an MPU.

5. The data selection apparatus as claimed in claim 3, wherein said first circuit includes a CAM output control circuit including small-scale logic circuits divided by flip-flops in which time series pipeline processing is performed; and said second circuit also includes small-scale logic circuits divided by flip-flops in which time series pipeline processing is performed.

6. A data selection apparatus comprising:

search units each of which search units comprises table search circuits and a data output control circuit, said table search circuit selecting data from a stored data table, which data includes an entry matching a search key which is a bit sequence of a part of input data, said data output control circuit performing a first selection process in which the highest priority output data is selected from outputs of said table search circuits;

a unit output control device which performs a second selection process in which the highest priority output data is selected from outputs of said search units;

data search success signal output means which sends a data search success signal to said data output control circuit from a hit circuit which is a table search circuit which succeeds in a search;

unit search success signal output means which sends a unit search success signal indicating that there is at least said hit circuit in said search unit to said unit output control device before said data output control device performs said first selection process, wherein said data output control device starts said first selection process upon receiving said data search success signal and said unit output control device starts said second selection process upon receiving said unit search success signal and a data output control circuit in a search unit which is selected by said unit output control device selects output data of a table search circuit;

first stage search units each of which is said search unit;

nth (n 2) stage search units each of which nth stage search units includes (n–1)th stage search units and an (n–1)th stage unit output control device which selects the highest priority (n–1)th stage search unit from said (n–1)th stage search units; and an nth stage unit output control device which selects the highest priority nth stage search unit from said nth stage search units;

wherein said (n–1)th stage unit output control devices send nth stage unit search success signals to said nth stage unit output control device before each of said (n–1)th stage unit output control device selects an (n–1)th stage search unit; and wherein an (n–1)th stage search unit output selection process in said (n–1)th stage unit output control devices and an nth stage search unit output selection process in said nth stage unit output control device are performed in parallel at least in part so that output data of a table search circuit is selected.

7. The data selection apparatus as claimed in claim 6, wherein each of said first stage search units sends a unit search success signal to unit output control devices of second or later stages instead of (k–1)th (2 k n) stage unit output control devices sending said unit search success signal to a kth stage unit output control device.

8. The data selection apparatus as claimed in claim 6, wherein said data output control circuit includes a CAM output control circuit including small-scale logic circuits divided by flip-flops in which time series pipeline processing is performed, and said unit output control device also includes small-scale logic circuits divided by flip-flops in which time series pipeline processing is performed.

9. The data selection apparatus as claimed in claim 6, wherein said data output control circuit includes a CAM output control circuit including small-scale logic circuits divided by flip-flops in which time series pipeline processing is performed, and said unit output control device also includes small-scale logic circuits divided by flip-flops in which time series pipeline processing is performed.

10. The data selection apparatus as claimed in claim 6, wherein each of said table search circuits includes a RAM and an MPU.

11. The data selection apparatus as claimed in claim 6, wherein each of said table search circuits includes a RAM and an MPU.

12. A packet processing apparatus including a data selection apparatus, said data selection apparatus comprising:

search units each of which search units includes table search circuits and a first circuit which performs a first selection process in which a table search circuit which outputs data is selected from table search circuits each of which succeeds in a search based on an input packet; and a second circuit which performs a second selection process in which a search unit which outputs data is selected from search units each of which includes a table search circuit which succeeds in a search;

wherein:

when said first circuit receives a first signal which indicates that there is a table search circuit which succeeds in a search, said first circuit sends a second signal to said second circuit before performing said first selection process, said second signal indicating that there is at least one table search circuit which succeeds in a search;

said second circuit performs said second selection process when said second circuit receives said second signal;

a search unit which is selected by said second selection process outputs data of a table search circuit that is selected by said first selection process, said data being used as a destination address to which said input packet is transferred; and said first selection process and said second selection process are performed in parallel at least in part so that output data of a table search circuit is selected.

13. The packet processing apparatus as claimed in claim 12, wherein each of said search units has a third circuit, outside of said first circuit, which third circuit sends said first signal to said second circuit; and said first circuit performs said first selection process at the same time as when said third circuit sends said first signal to said second circuit.

14. A packet processing apparatus including a data selection apparatus, said data selection apparatus comprising:

search units each of which search units comprises table search circuits and a data output control circuit, said table search circuit selecting data from a stored data table, which data includes an entry matching a search key which is a bit sequence of a part of an input packet, said data output control circuit performing a first selection process in which the highest priority output data is selected from outputs of said table search circuits;

a unit output control device which performs a second selection process in which the highest priority output data is selected from outputs of said search units;

data search success signal output means which sends a data search success signal to said data output control circuit from a hit circuit which is a table search circuit which succeeds in a search; and unit search success signal output means which sends a unit search success signal indicating that there is at least said hit circuit in said search unit to said unit output control device before said data output control device performs said first selection process, wherein said data output control device starts said first selection process upon receiving said data search success signal and said unit output control device starts said second selection process upon receiving said unit search success signal, and a data output control circuit in a search unit which is selected by said unit output control device selects output data of a table search circuit, said output data being used as a destination address to which said input packet is transferred;

first stage search units each of which is said search unit;

nth (n 2) stage search units each of which nth stage search units includes (n–1)th stage search units and an (n–1)th stage unit output control device which selects the highest priority (n–1)th stage search unit from said (n–1)th stage search units; and an nth stage unit output control device which selects the highest priority nth stage search unit from said nth stage search units;

wherein said (n–1)th stage unit output control devices send nth stage unit search success signals to said nth stage unit output control device before each of said (n–1)th stage unit output control device selects an (n–1)th stage search unit; and wherein an (n–1)th stage search unit output selection process in said (n–1)th stage unit output control devices and an nth stage search unit output selection process in said nth stage unit output control device are performed in parallel at least in part so that output data of a table search circuit is selected.

15. The packet processing apparatus as claimed in claim 14, wherein each of said first stage search units sends a unit search success signal to unit output control devices of second or later stages instead of (k–1)th (2 k n) stage unit output control devices sending said unit search success signal to a kth stage unit output control device.

* * * * *